(12) United States Patent
Swoish et al.

(10) Patent No.: US 8,806,852 B2
(45) Date of Patent: Aug. 19, 2014

(54) METHOD FOR CONTROLLING REGENERATION WITHIN AN AFTER-TREATMENT COMPONENT OF A COMPRESSION-IGNITION ENGINE

(75) Inventors: Christopher C. Swoish, Lapeer, MI (US); Christopher Whitt, Howell, MI (US); Douglas Christopher Sarsen, Howell, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 242 days.

(21) Appl. No.: 13/368,427

(22) Filed: Feb. 8, 2012

(65) Prior Publication Data

US 2013/0199159 A1 Aug. 8, 2013

(51) Int. Cl.
*F01N 3/00* (2006.01)
*F01N 9/00* (2006.01)

(52) U.S. Cl.
CPC .. *F01N 9/00* (2013.01); *F01N 9/002* (2013.01)
USPC .................... 60/274; 60/286; 60/295; 60/311

(58) Field of Classification Search
USPC .................................. 60/286, 295, 297, 311
See application file for complete search history.

(56) References Cited

U.S. PATENT DOCUMENTS

| | | | |
|---|---|---|---|
| 6,725,652 B2 * | 4/2004 | Sakaguchi | 60/297 |
| 7,698,888 B2 * | 4/2010 | Wyatt | 60/295 |
| 2010/0011750 A1 * | 1/2010 | Onodera et al. | 60/287 |
| 2010/0101409 A1 * | 4/2010 | Bromberg et al. | 95/8 |
| 2010/0126145 A1 * | 5/2010 | He et al. | 60/286 |

* cited by examiner

*Primary Examiner* — Thomas Denion
*Assistant Examiner* — Philip Eklem
(74) *Attorney, Agent, or Firm* — Cantor Colburn LLP

(57) ABSTRACT

A method for controlling regeneration within an after-treatment component of a compression-ignition engine includes receiving a value of a parameter associated with an exhaust stream passing through the after-treatment component and determining a rate of change of the parameter. A filtered parameter value is calculated based on the value of the parameter, the rate of change of the parameter, and a predetermined filtering relationship for the parameter. Accumulated particulate matter in the after-treatment component is estimated based, at least, on a soot accumulation model and the filtered parameter value. The estimate of accumulated particulate matter in the after-treatment component is compared to a predetermined threshold associated with the after-treatment component, and a remedial action is initiated when the estimate of accumulated particulate matter in the after-treatment component exceeds the predetermined threshold.

20 Claims, 2 Drawing Sheets

METHOD FOR CONTROLLING REGENERATION WITHIN AN AFTER-TREATMENT COMPONENT OF A COMPRESSION-IGNITION ENGINE

FIELD OF THE INVENTION

The subject invention relates to after-treatment systems for compression-ignition engines and more particularly to a method for controlling regeneration within an after-treatment component of a compression-ignition engine.

BACKGROUND

The emission of particulate matter in exhaust from compression-ignition engines is regulated for environmental reasons. Thus, vehicles equipped with compression-ignition engines often include after-treatment components such as particulate filters, catalyzed soot filters and adsorption catalysts for removing particulate matter and other regulated constituents (e.g., nitrogen oxides or NOx) from their exhaust streams. Particulate filters and other after-treatment components can be effective, but can also increase back pressure as they collect particulate matter.

Particulate matter may include ash and unburned carbon particles generally referred to as soot. As this carbon-based particulate matter accumulates in the after-treatment components, it can increase back pressure in the exhaust system. Engines that have large rates of particulate mass emission can develop excessive back pressure levels in a relatively short period of time, decreasing engine efficiency and power producing capacity. Therefore, it is desired to have particulate filtration systems that minimize back-pressure while effectively capturing particulate matter in the exhaust.

To accomplish both of these competing goals, after-treatment components must be regularly monitored and maintained either by replacing components or by removing the accumulated soot. Cleaning the accumulated soot from an after-treatment component can be achieved via oxidation to $CO_2$ (i.e., burning-off) and is known in the art as regeneration. To avoid service interruptions, regeneration is generally preferred over replacement of after-treatment components.

One way that regeneration may be accomplished is by increasing the temperatures of the filter material and/or the collected particulate matter to levels above the combustion temperature of the particulate matter. Elevating the temperature facilitates consumption of the soot by allowing the excess oxygen in the exhaust gas to oxidize the particulate matter. Particulate matter may also be oxidized, and thus removed, at lower temperatures by exposing the particulate matter to sufficient concentrations of nitrogen dioxide ($NO_2$). Exhaust from a compression-engine, such as a diesel engine, typically contains NOx, which consists primarily of nitric oxide (NO) and approximately 5 to 20 percent $NO_2$, with greater levels of $NO_2$ being common where oxidation catalysts are present in the exhaust stream. Thus, some level of regeneration occurs even at relatively low temperatures.

The regeneration process can be either passive or active. In passive systems, regeneration occurs whenever heat (e.g., carried by the exhaust gasses) and soot (e.g., trapped in the after-treatment components) are sufficient to facilitate oxidation, and/or whenever sufficient concentrations of $NO_2$ are present in the exhaust to enable oxidation at lower temperatures. In active systems, regeneration is induced at desired times by introducing heat from an outside source (e.g., an electrical heater, a fuel burner, a microwave heater, and/or from the engine itself, such as with a late in-cylinder injection or injection of fuel directly into the exhaust stream). Active regeneration can be initiated during various vehicle operations and exhaust conditions. Among these favorable operating conditions are stationary vehicle operations such as when the vehicle is at rest, for example, during a refueling stop. Engine control systems can be used to predict when it may be advantageous to actively facilitate a regeneration event and to effectuate control over the regeneration process.

Accordingly, it is desirable to provide an improved system and method for determining when to facilitate active regeneration and for controlling active regeneration of particulate filtration systems.

SUMMARY OF THE INVENTION

In one exemplary embodiment of the invention, a method for controlling regeneration within an after-treatment component of a compression-ignition engine includes receiving a value of a parameter associated with an exhaust stream passing through the after-treatment component and determining a rate of change of the parameter. A filtered parameter value is calculated based on the value of the parameter, the rate of change of the parameter, and a predetermined filtering relationship for the parameter. Accumulated particulate matter in the after-treatment component is estimated based, at least, on a soot accumulation model and the filtered parameter value. The estimate of accumulated particulate matter in the after-treatment component is compared to a predetermined threshold associated with the after-treatment component, and a remedial action is initiated when the estimate of accumulated particulate matter in the after-treatment component exceeds the predetermined threshold.

In another exemplary embodiment of the invention, a system for controlling regeneration within an after-treatment component of a compression-ignition engine includes a regeneration controller having a processor coupled to a memory storage device. The regeneration controller is configured to determine a value of a parameter associated with an exhaust stream passing through the after-treatment component and a rate of change of the parameter. The regeneration controller is also configured to calculate a filtered first parameter value based on the value of the parameter, the rate of change of the parameter, and a predetermined filtering relationship for the parameter. In addition, the regeneration controller is configured to calculate an estimate of accumulated particulate matter in the after-treatment component based, at least, on a soot accumulation model and the filtered parameter value, to compare the estimate of accumulated particulate matter in the after-treatment component to a predetermined threshold associated with the after-treatment component, and to initiate a remedial action when the estimate of accumulated particulate matter in the after-treatment component exceeds the predetermined threshold.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

Figure 1:
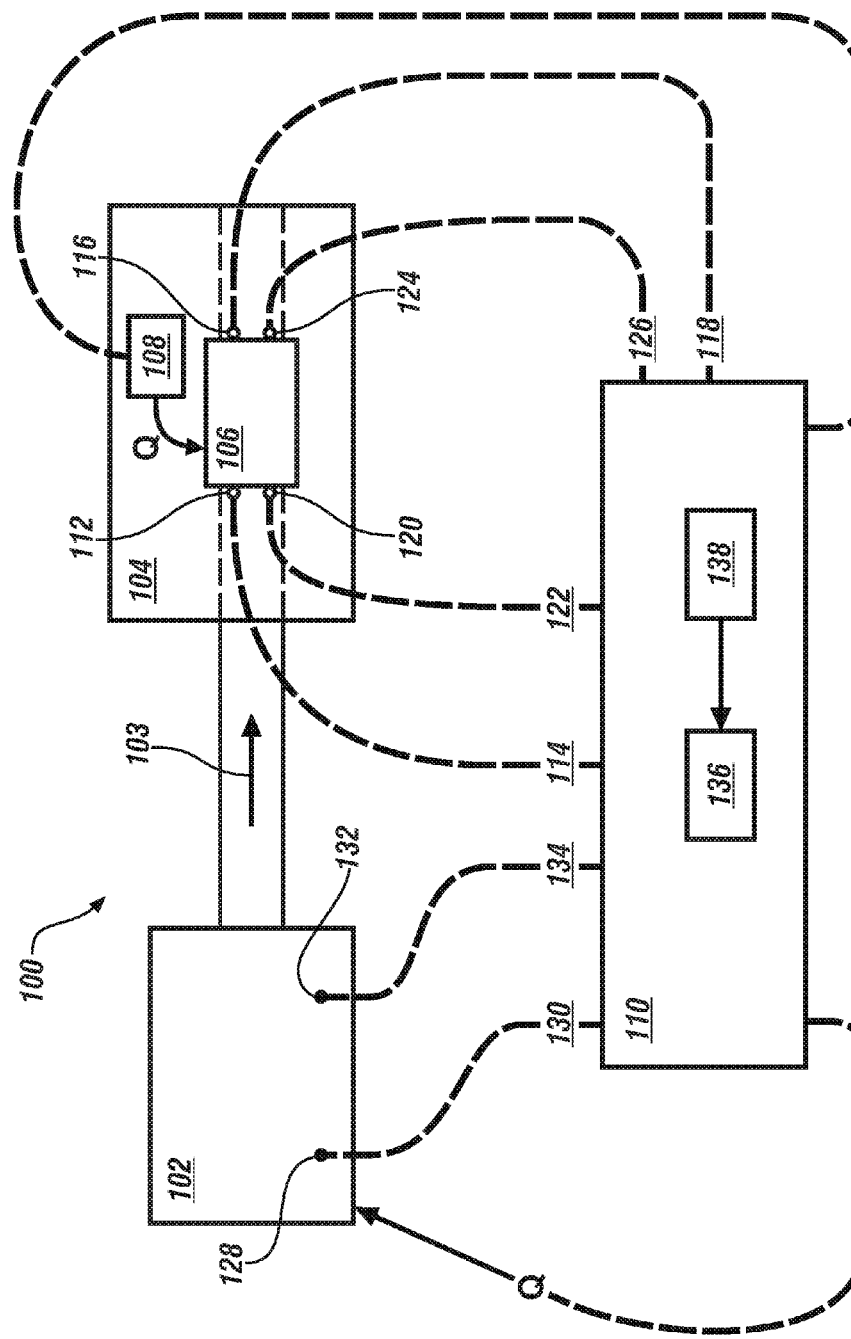
FIG. 1 is a schematic diagram showing an exemplary system for controlling regeneration within an after-treatment component of a compression-ignition engine.

The following description is merely exemplary in nature and is not intended to limit the present disclosure, its application or uses. It should be understood that throughout the drawings, corresponding reference numerals indicate like or corresponding parts and features.

In accordance with an exemplary embodiment of the invention, as shown in FIG. 1, an exemplary system 100 for controlling regeneration within an after-treatment component of a compression-ignition engine includes a compression-ignition engine 102 coupled to an exhaust system 104 through which exhaust 103 from engine 102 passes and is treated before being discharged to the atmosphere. Exhaust system 104 includes at least one after-treatment component 106 such as a particulate filter for removing particulate matter and other regulated constituents from the exhaust stream. A heater 108 is configured for adding heat to the after-treatment component 106 to induce regeneration in the after-treatment component 106. A regeneration controller 110 is configured to predict when it may be necessary or advantageous to undergo regeneration in the after-treatment component and, when appropriate, to actively facilitate a regeneration event. The regeneration controller 110 may facilitate such an event, for example, by introducing heat to the after-treatment component 106 from an outside source such as the heater 108 or by causing injection of fuel into the engine 102 or the exhaust system 104.

To enable the regeneration controller 110 to perform its functions, various instruments are positioned within the engine 102 and the exhaust system 104. The instruments are configured to be responsive to changes in relevant parameters in the engine 102 and the exhaust system 104 and to transmit signals to the regeneration controller 110 with the signals being indicative of operation of the engine 102 and the after-treatment component 104. For example, in an exemplary embodiment, an upstream pressure sensor 112 measures pressures of the exhaust stream upstream from the after-treatment component 106 and produces upstream pressure signals 114. Similarly, a downstream pressure sensor 116 measures pressures of the exhaust stream downstream from the after-treatment component 106 and produces downstream pressure signals 118. In addition, an upstream temperature sensor 120 measures temperatures of the exhaust stream upstream from the after-treatment component 106 and produces upstream temperature signals 122. A downstream temperature sensor 124 measures temperatures of the exhaust stream downstream from the after-treatment component 106 and produces downstream temperature signals 126. An engine speed sensor 128 senses speeds of the engine 102 and produces engine speed signals 130. An engine flow sensor 132 senses mass flow rates of working fluid (e.g., air or air and fuel or exhaust gas) flowing in the engine 102 or exhaust system 104 and produces engine flow rate signals 134.

The regeneration controller 110 receives the upstream pressure signals 114, downstream pressure signals 118, upstream temperature signals 122, downstream temperature signals 126, engine speed signals 130, and engine flow rate signals 134 from the upstream pressure sensor 112, the downstream pressure sensor 116, the upstream temperature sensor 120, the downstream temperature sensor 124, the engine speed sensor 128, and the engine flow sensor 132. A processor 136 of the regeneration controller 110 cooperates with a memory 138 associated with the regeneration controller 110 to execute instructions that are configured to enable the regeneration controller 110 to predict when it may be necessary or advantageous to undergo regeneration in the after-treatment component and, when appropriate, to actively facilitate a regeneration event.

For example, in an exemplary embodiment, a regeneration controller 110 is configured to estimate a quantity of particulate matter accumulation in the after-treatment component 106 by calculating a pressure drop index indicative of a decrease in pressure of the exhaust stream 103 as it passes through the after-treatment component 106. In an exemplary embodiment, the regeneration controller 110 uses the upstream pressure signals 114 and the downstream pressure signals 118 to compute this index. Similarly, the regeneration controller may base its estimate of the quantity of particulate matter accumulation in the after-treatment component 106 on a flow rate index indicative of a rate of flow of the exhaust stream 103. Thus, the regeneration controller 110 may use the engine flow rate signals 134 or the engine speed signals from the engine speed sensor 128 or the engine flow sensor 132 to generate this flow rate index. Still further, a regeneration controller 110 may be configured to estimate a quantity of particulate matter accumulation in the after-treatment component 106 or to otherwise facilitate regeneration by calculating a temperature index indicative of a temperature of the exhaust stream 103 or of a change in temperature of the exhaust stream as it passes through the after-treatment component 106. In an exemplary embodiment, the regeneration controller 110 uses the upstream temperature signals 122 and the downstream temperature signals 126 to compute this index.

In one embodiment, the pressure drop index is calculated as a ratio of upstream to downstream pressure (i.e., PR=Pu/Pd) so as to represent a pressure ratio across the after-treatment component. In another embodiment, the pressure drop index is calculated as a difference between the upstream and downstream pressures (i.e., DP=Pu−Pd) so as to represent a difference in pressure across the after-treatment component. In still another embodiment, the pressure drop index is calculated as the difference between the upstream and downstream pressures divided by the magnitude of the upstream pressure (i.e., as a normalized pressure drop, DPP=DP/Pu) so as to represent a normalized difference in pressure across the after-treatment component. As those skilled in the art will appreciate, the above-described flow rate index signal can be produced by an engine speed sensor or a mass airflow sensor or any other sensor configured to sense an engine operating condition that is indicative of the relative flow rate of the exhaust stream 103.

In addition, the regeneration controller 110 is configured to determine a rate of change of any of the above-described parameters. For example, a rate of change may be calculated by capturing a first signal associated with a first parameter (e.g., one of the upstream pressure signals 114, downstream pressure signals 118, upstream temperature signals 122, downstream temperature signals 126, engine speed signals 130, engine flow rate signals 134, or one of the indexes described above) at a first time, and capturing a second reading associated with that same parameter at a second time, wherein the second time occurs an incremental amount of time after the first time. Then, the regeneration controller 110 may determine a change in the readings associated with the first parameter by calculating a difference between the second reading and the first reading. From that change, the regeneration controller 110 may determine a rate of change in the readings associated with the first parameter.

It has been observed that signals associated with some of the above-described parameters (e.g., pressure drop index) may deviate from their steady-state values when the engine is undergoing transient maneuvers. Such transient maneuvers can be characterized as transient increases or decreases in engine speed, and may correspond to transient increases or decreases in engine flow rates. Thus, the above-described rates of change can be helpful in quantifying an extent of unsteadiness in engine or exhaust system operation.

It has also been observed that such transient conditions tend to correspond to shifts in the relationships between the above-described sensed or calculated parameters and the amount of soot that may have accumulated in an after-treatment component and, accordingly, when it may be necessary or advantageous to undergo regeneration in the after-treatment component. For example, when the flow rate is increasing, the relationship between the pressure drop index and the amount of accumulated soot may follow a first characteristic, and this first characteristic may differ significantly from a second characteristic associated with steady flow rates or a third characteristic associated with decreasing flow rates.

To compensate for differences between these relationships, the regeneration controller 110 may use the rate of change of the parameter, along with a predetermined filtering relationship for that particular parameter, to calculate a filtered version of the parameter. In an exemplary embodiment, this may be accomplished by first comparing the rate of change in the readings associated with the first parameter to a predetermined threshold value (e.g., zero) so as to determine a comparison result associated with the first parameter. Next, based on the comparison result, a relevant soot model mask is selected. The selected mask is associated with the particular parameter and provides a way to adjust the soot model for instabilities in the first parameter. In accordance with this embodiment, masks may be available for numerous levels of instability. In a simplified embodiment, one mask applies to decreasing trends in the parameter, and another mask applies to situations where values of the parameter are increasing.

Having developed a filtered version of the parameter, the regeneration controller 110 may estimate the accumulated particulate matter in the after-treatment component based, at least in part, on a soot accumulation model and the filtered parameter value. This estimate represents the amount of particulate matter that is predicted to have accumulated in the after-treatment component. The pressure-based soot accumulation model, which may be based on empirical data, is configured to reflect the relationship between the amount of particulate matter that has accumulated in the after-treatment component, the pressure drop index, and the flow index. By adjusting (i.e., filtering) a parameter (e.g., the pressure drop index) for non-steady behavior prior to accessing the soot accumulation model, the regeneration controller 110 can compensate for effects of non-steady conditions in the exhaust system 104 and/or the after-treatment component 106.

Since the estimate of matter accumulated in the after-treatment component is to be compared to a predetermined threshold associated with the after-treatment component, and since a remedial action may be facilitated when the adjusted estimate of accumulated particulate matter in the after-treatment component exceeds the predetermined threshold, inaccuracies in the process would have the potential to trigger regeneration processes unnecessarily or late. Therefore, by accounting for unsteadiness in engine operation, and by distinguishing between different rates of change in the sensed or calculated parameters, the regeneration controller 110 may also differentiate the filtering rates applied to parameters used to determine corresponding soot accumulation rates, thereby improving calibration flexibility and robustness of soot accumulation models.

Figure 2:
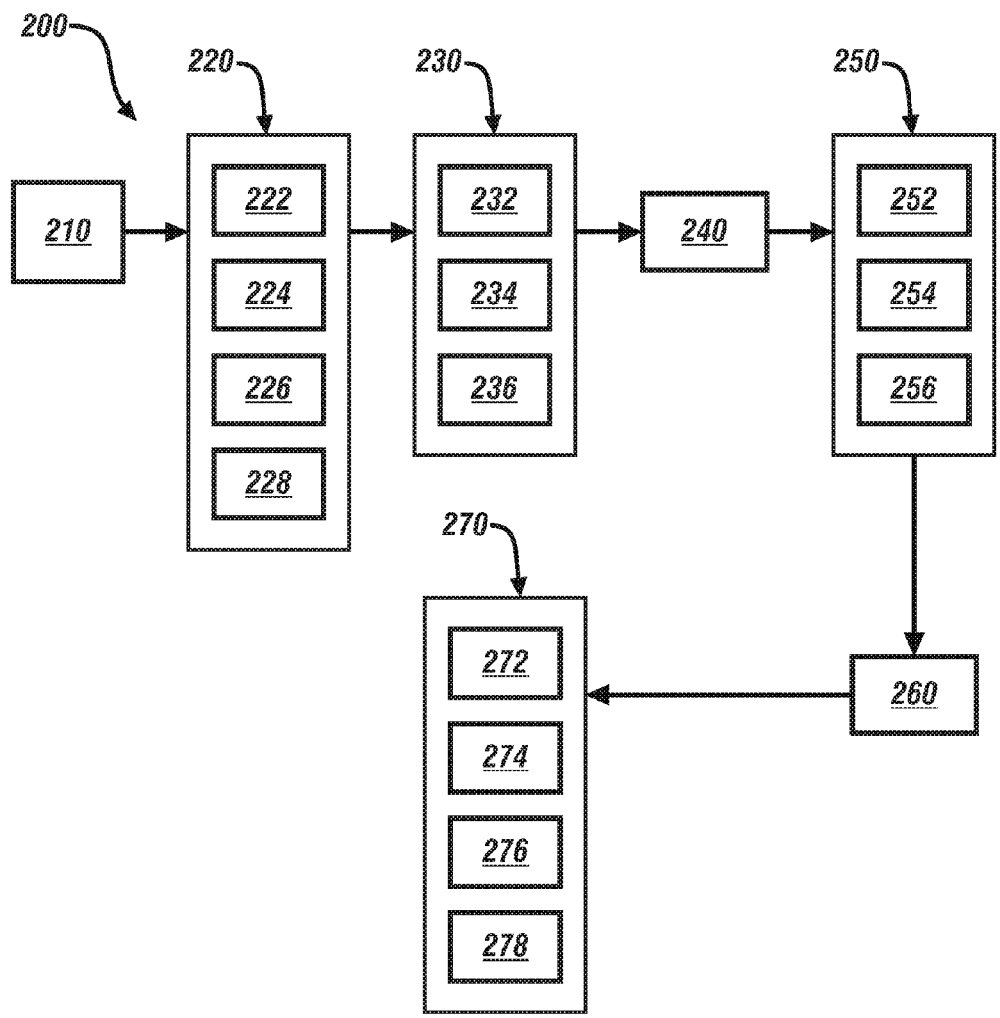
FIG. 2 is a process flow diagram showing an exemplary process for controlling regeneration within an after-treatment component of a compression-ignition engine.

In accordance with an exemplary embodiment of the invention, as shown in FIG. 2, an exemplary process 200 for controlling regeneration within an after-treatment component of a compression-ignition engine, such as a particulate filter, generally includes the step of receiving one or more values of one or more parameters associated with an exhaust stream 103 passing through the after-treatment component (step 210). In an exemplary embodiment, the parameter may represent upstream pressure, downstream pressure, upstream temperature, downstream temperature, engine speed, or engine flow rate. The value may be received as a signal from the upstream pressure sensor 112, the downstream pressure sensor 116, the upstream temperature sensor 120, the downstream temperature sensor 124, the engine speed sensor 128, and the engine flow sensor 132. The parameter may be a pressure drop index indicative of a decrease in pressure of an exhaust stream as it passes through the after-treatment component, a flow rate index indicative of a rate of flow of the exhaust stream, or a temperature index indicative of a temperature of the exhaust stream.

In addition to receiving one or more values, the process 200 includes receiving (i.e., receiving a signal or determining based on received signals) a signal indicative of a rate of change of the values of the above-described one or more parameters associated with the exhaust stream passing through the after-treatment component (step 220). Next, filtered parameter values are calculated based on the value of each parameter, the rate of change of each particular parameter, and predetermined filtering relationships for each particular parameter (step 230). In an exemplary embodiment, this step is repeated for each parameter of interest where it is desired to account for non-steadiness in a parameter (step 240). Next, an estimate of accumulated particulate matter in the after-treatment component is calculated based, at least, on a soot accumulation model and the filtered parameter values (step 250). The estimate of accumulated particulate matter in the after-treatment component is then compared to one or more predetermined thresholds associated with the after-treatment component (step 260). A remedial action is initiated when the adjusted estimate of accumulated particulate matter in the after-treatment component exceeds the predetermined threshold (step 270).

In an exemplary embodiment, the step of determining a signal indicative of a rate of change of the values of the parameters (step 220) is performed by capturing a first reading associated with a parameter at a first time (step 222) and capturing a second reading associated with the parameter at a second time, wherein the second time occurs an incremental amount of time after the first time (step 224). A change in the readings associated with the parameter is determined by calculating a difference between the second reading and the first reading (step 226), and a rate of change in the readings associated with the parameter is determined (step 228) by dividing the difference by the time increment.

In an exemplary embodiment, the step of calculating filtered parameter values (step 230) includes comparing the rate of change in the readings associated with each parameter to corresponding predetermined threshold values (e.g., zero) so as to determine a comparison result associated with each parameter (e.g., differentiating positive versus negative rates of change) (step 232). Next, a relevant soot model mask associated with each parameter is selected based on the comparison result associated with the respective parameter (step 234). Finally, the relevant soot model mask (i.e., filter rate, scalar, adder) associated with the particular parameter is applied (i.e., multiplied, added, etc) so as to inputs to the soot model, and thereby adjust the soot model, to account for instability in each parameter (step 236).

In an exemplary embodiment, the step of estimating the quantity of accumulated particulate matter in the after-treatment component (step 250) begins with the calculation or receipt of a pressure drop index indicative of a decrease in pressure of an exhaust stream 103 as it passes through the after-treatment component (step 252). In an exemplary embodiment, the pressure drop index is indicative of the level of pressure decrease experienced by the exhaust stream as it passes through the after-treatment component. In one embodiment, the pressure drop index is calculated as a ratio of upstream to downstream pressure (i.e., PR=Pu/Pd) so as to represent a pressure ratio across the after-treatment component.

In another embodiment, the pressure drop index is calculated as a difference between the upstream and downstream pressures (i.e., DP=Pu−Pd) so as to represent a difference in pressure across the after-treatment component. In still another embodiment, the pressure drop index is calculated as the difference between the upstream and downstream pressures divided by the magnitude of the upstream pressure (i.e., as a normalized pressure drop, DPP=DP/Pu) so as to represent a normalized difference in pressure across the after-treatment component. An exemplary step of estimating the quantity of accumulated particulate matter in the after-treatment component (step 250) also includes determining a flow rate index that is indicative of a relative flow rate of the exhaust stream (step 254). The flow rate index signal can be produced by an engine speed sensor or a mass airflow sensor or any other sensor configured to sense an engine operating condition that is indicative of the relative flow rate of the exhaust stream 103.

Once the pressure drop index and the flow index of the exhaust stream 103 have been determined, an exemplary step of estimating the quantity of accumulated particulate matter in the after-treatment component (step 250) employs a pressure-based soot accumulation model (step 256) to estimate the accumulated particulate matter in the after-treatment component based on the pressure drop index and the flow rate index. This estimate represents the amount of particulate matter that is predicted to have accumulated in the after-treatment component. The pressure-based soot accumulation model, which may be based on empirical data, is configured to reflect the relationship between the amount of particulate matter that has accumulated in the after-treatment component, the pressure drop index, and the flow index.

In an exemplary embodiment, the step of initiating a remedial action (step 270) comprises adjusting one or more engine control parameters so as to modify operation of the engine to promote passive regeneration in the after-treatment component (step 272). For example, the one or more adjustments may be configured to provide a minimum temperature at the after-treatment component promoting passive regeneration in the after-treatment component. Alternatively the one or more adjustments may comprise modifying fueling and timing of the engine (step 274) or activating an auxiliary heating element to increase a temperature of the exhaust stream (step 276) or activating a warning light instructing the operator to initiate regeneration in (or replacement of) the after-treatment component (step 278).

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. A method for controlling regeneration within an after-treatment component of an engine, comprising:
   receiving a value of a first parameter associated with an exhaust stream passing through the after-treatment component;
   determining a rate of change of the first parameter;
   comparing the rate of change of the first parameter against a first predetermined threshold value to produce a first comparison result;
   selecting a first soot model mask associated with the first parameter based on the first comparison result;
   calculating a filtered first parameter value based on the value of the first parameter, the rate of change of the first parameter, and a predetermined filtering relationship for the first parameter that is based on the first soot model mask associated with the first parameter;
   calculating an estimate of accumulated particulate matter in the after-treatment component based, at least, on a soot accumulation model and the filtered first parameter value;
   comparing the estimate of accumulated particulate matter in the after-treatment component to a predetermined threshold associated with the after-treatment component; and
   initiating a remedial action when the estimate of accumulated particulate matter in the after-treatment component exceeds the predetermined threshold.

2. The method of claim 1, wherein the first parameter is a pressure drop index indicative of a decrease in pressure of an exhaust stream as it passes through the after-treatment component.

3. The method of claim 1, wherein the first parameter is a flow rate index indicative of a rate of flow of the exhaust stream.

4. The method of claim 1, wherein the first parameter is a temperature index indicative of a temperature of the exhaust stream.

5. The method of claim 1, further comprising:
   receiving a value of a second parameter associated with the exhaust stream passing through the after-treatment component;
   receiving a rate of change of the second parameter;
   comparing the rate of change of the second parameter against a second predetermined threshold value to produce a second comparison result;
   selecting a second soot model mask associated with the second parameter based on the second comparison result; and
   calculating a filtered second parameter value based on the value of the second parameter, the rate of change of the second parameter, and a predetermined filtering relationship for the second parameter that is based on the second soot model mask associated with the second parameter;
   wherein calculating an estimate of accumulated particulate matter in the after-treatment component is based, at least, on the soot accumulation model, the filtered first parameter value, and the filtered second parameter value.

6. The method of claim 5, wherein the first parameter is a pressure drop index indicative of a decrease in pressure of an exhaust stream as it passes through the after-treatment component, and wherein the second parameter is a flow rate index indicative of a rate of flow of the exhaust stream.

7. The method of claim 5, wherein the first parameter is a pressure drop index indicative of a decrease in pressure of an exhaust stream as it passes through the after-treatment component, and wherein the second parameter is a temperature index indicative of a temperature of the exhaust stream.

8. The method of claim 5, wherein the first parameter is a temperature index indicative of a temperature of the exhaust stream, and wherein the second parameter is a flow rate index indicative of a rate of flow of the exhaust stream.

9. The method of claim 5, further comprising:
receiving a value of a third parameter associated with the exhaust stream passing through the after-treatment component;
receiving a rate of change of the third parameter;
comparing the rate of change of the third parameter against a third predetermined threshold value to produce a third comparison result;
selecting a third soot model mask associated with the third parameter based on the third comparison result; and
calculating a filtered third parameter value based on the value of the third parameter, the rate of change of the third parameter, and a predetermined filtering relationship for the third parameter that is based on the third soot model mask associated with the third parameter;
wherein calculating an estimate of accumulated particulate matter in the after-treatment component is based, at least, on the soot accumulation model, the filtered first parameter value, the filtered second parameter value, and the filtered third parameter value.

10. The method of claim 9, wherein the first parameter is a pressure drop index indicative of a decrease in pressure of an exhaust stream as it passes through the after-treatment component, wherein the second parameter is a flow rate index indicative of a rate of flow of the exhaust stream, and the third parameter is a temperature index indicative of a temperature of the exhaust stream.

11. The method of claim 2, wherein the pressure drop index represents a pressure ratio across the after-treatment component.

12. The method of claim 3, wherein the flow rate index is based on a speed of the engine.

13. The method of claim 1, wherein initiating a remedial action comprises adjusting one or more engine control parameters so as to modify operation of the engine to promote passive regeneration in the after-treatment component.

14. The method of claim 13, wherein said adjusting is configured to provide a minimum temperature at the after-treatment component to promote regeneration in the after-treatment component.

15. The method of claim 13, wherein said adjusting comprises modifying fueling and timing of the engine.

16. The method of claim 13, wherein said adjusting comprises activating an auxiliary heating element to increase a temperature of the exhaust stream.

17. The method of claim 13, wherein the remedial action comprises activating a warning light instructing an operator to initiate regeneration in the after-treatment component.

18. A system for controlling regeneration within an after-treatment component comprising:
a regeneration controller having a processor coupled to a memory storage device, the regeneration controller being configured to:
determine a value of a first parameter associated with an exhaust stream passing through the after-treatment component;
determine a rate of change of the first parameter;
compare the rate of change of the first parameter against a first predetermined threshold value to produce a first comparison result;
select a first soot model mask associated with the first parameter based on the first comparison result;
calculate a filtered first parameter value based on the value of the first parameter, the rate of change of the first parameter, and a predetermined filtering relationship for the first parameter that is based on the first soot model mask associated with the first parameter;
calculate an estimate of accumulated particulate matter in the after-treatment component based, at least, on a soot accumulation model and the filtered first parameter value;
compare the estimate of accumulated particulate matter in the after-treatment component to a predetermined threshold associated with the after-treatment component; and
initiate a remedial action when the estimate of accumulated particulate matter in the after-treatment component exceeds the predetermined threshold.

19. The system of claim 18, wherein the first parameter is a pressure drop index indicative of a decrease in pressure of an exhaust stream as it passes through the after-treatment component.

20. The system of claim 18, wherein the first parameter is a flow rate index indicative of a rate of flow of an exhaust stream as it passes through the after-treatment component.

* * * * *